3,443,347
Patented May 13, 1969

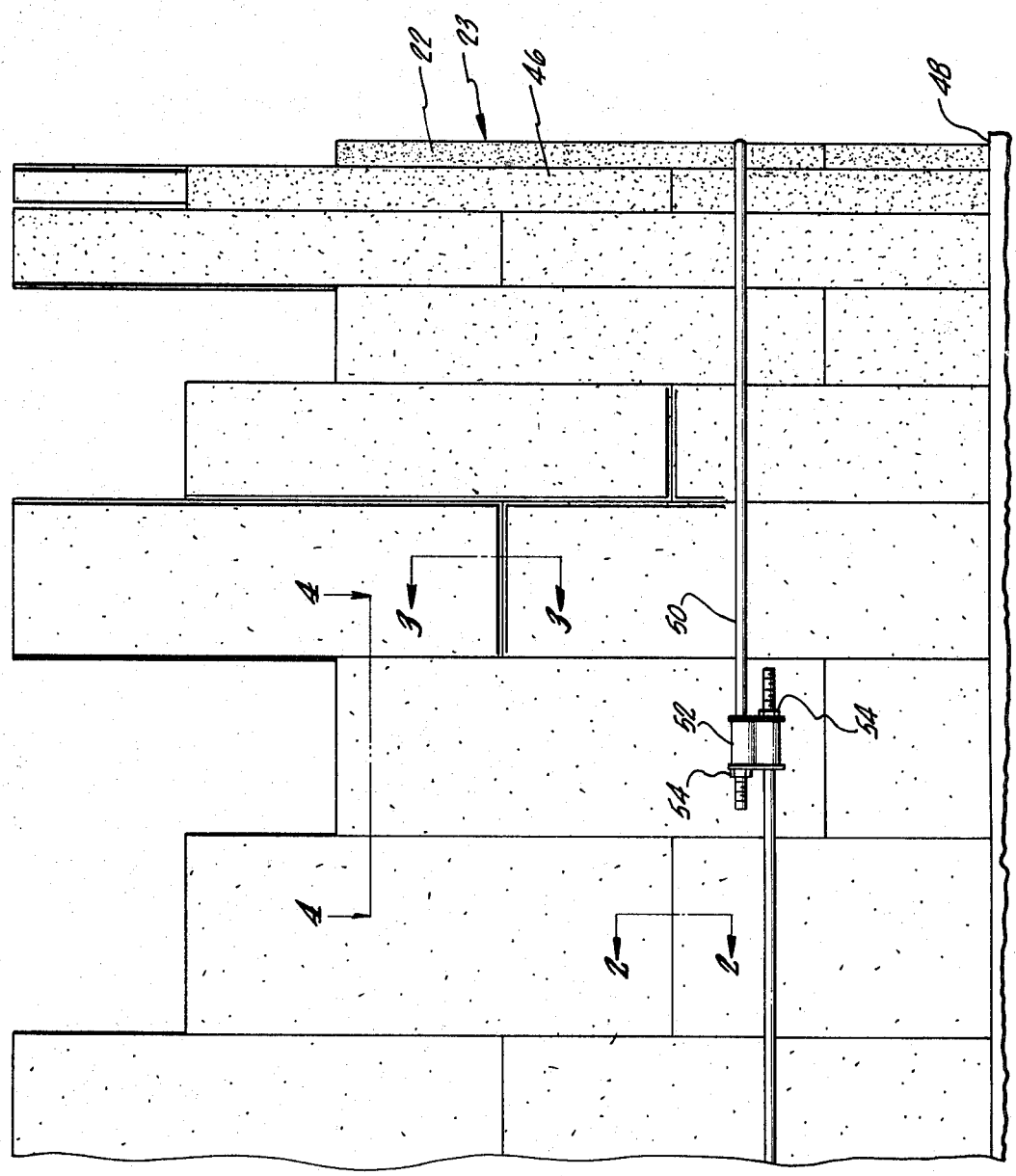

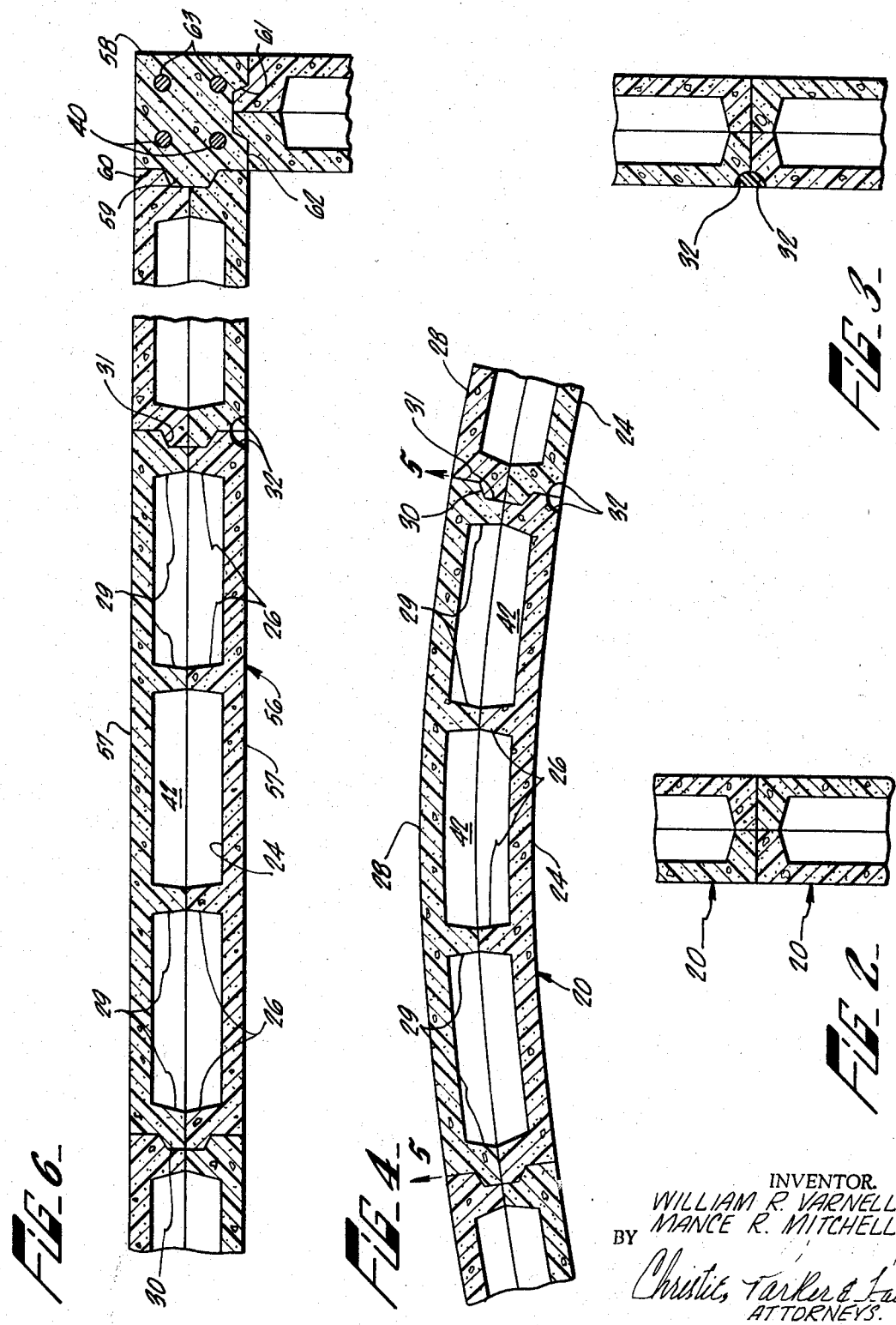

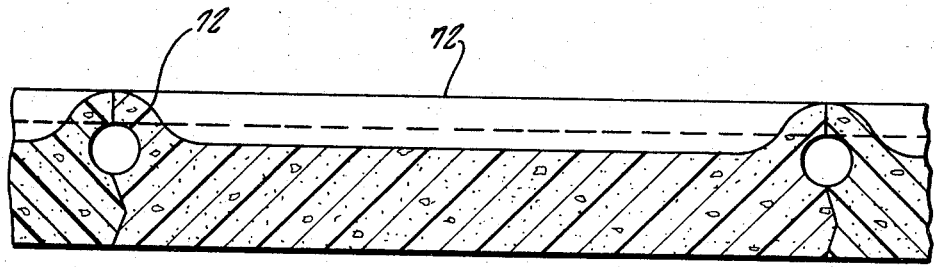
FIG_9_
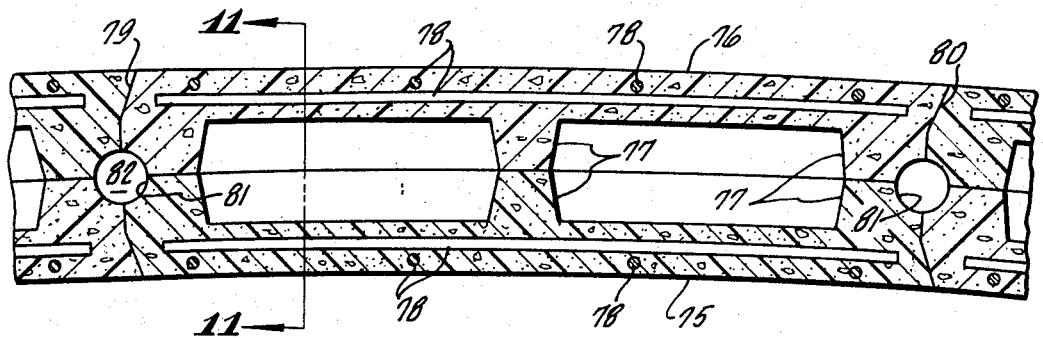
FIG_10_
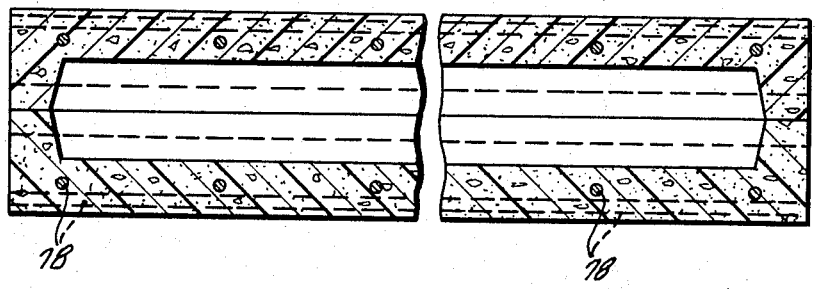
FIG_11_
INVENTOR.
WILLIAM R. VARNELL
MANCE R. MITCHELL
BY
Christie, Parker & Hale
ATTORNEYS.

3,443,347
STRUCTURES MADE FROM POLYESTER
RESIN CONCRETE
William R. Varnell and Mance R. Mitchell, San Antonio, Tex., assignors to Concrete Development Corporation, San Antonio, Tex., a corporation of Texas
Continuation-in-part of application Ser. No. 427,568, Jan. 25, 1965. This application Mar. 22, 1968, Ser. No. 718,309
Int. Cl. E04c 5/08, 1/00; E04b 7/00
U.S. Cl. 52—224                               5 Claims

ABSTRACT OF THE DISCLOSURE

Precast panel is made from plastic concrete with edges of the panel adapted to fit against edges of other panels. Means adjacent the edges define a channel, and plastic cement is disposed in the channel to bond the edges of the panels together.

*Cross-references to related applications*

This application is a continuation in part of our copending applications Ser. No. 366,322, filed May 11, 1964 (now abandoned), Ser. No. 427,568, filed Jan. 25, 1965 and now abandoned, and Ser. No. 659,830, filed July 6, 1967.

*Background of the invention*

This invention relates to precast polyester concrete panels for use in assembling structures such as tanks, silos, buildings, and the like.

Our copending applications disclose and claim a plastic concrete which is a mixture of plastic resin and aggregates. The aggregates are present in the concrete in the amount of about 40% up to about 95% of the product by weight. The aggregate is preferably graded in particle size to a range of less than 400 mesh up to a maximum size to leave a minimum of unfilled gaps or voids between adjacent particles of the aggregates. The maximum size or diameter of particles in any given usage of the concrete is generally limited to about one-half the thickness of the mass as finally employed in the finished product.

Ideally, the aggregates are graded so that the spaces between the largest aggregate particles are progressively filled by smaller particles so as to leave virtually no voids between the particles. The plastic resin is preferably polyester resin and is present in sufficient amount to coat the entire surface of each aggregate particle and bond it to adjacent particles and to fill those final voids in the mass which can be filled only as a liquid.

The precast panels of this invention are lightweight, stronger than conventional concrete, and are chemically inert, so that they make ideal building elements for assembling structures where these qualities are desired.

Moreover, the polyester concrete panels of this invention can be bonded together with a polyester resin cement without loss of shear strength at the joint. The term "polyester resin cement" is used to mean a polymerizable polyester resin with a fine filler such as silica flour or titanium dioxide ground to pass through 400 mesh screen.

This invention includes the discovery that finely divided solid particles of matter, normally chemically inert to the various plastics or resins or monomers and mixtures thereof employed in our invention, herein described and variously referred to as "plastics," "plastic mixtures," "resins," "resinous mixtures," or "resin-monomer mixtures," may be utilized, first, to stabilize and extend the shelf life of liquid plastics, resins, monomers and mixtures thereof prior to curing, and second, to change or modify the structural behavior and characteristics of plastics or resinous materials in such manner as to impart added stability, strength, rigidity and adhesive qualities, among other things, to such plastic materials after curing.

This invention further utilizes such aggregates, and such plastic materials and modifications thereof, first, to formulate adhesive coatings of unique characteristics to be employed in bonding one body to another, and second, for composing structural concretes to be employed in structural applications, in reinforced or unreinforced states.

As used herein the term "aggregate" describes a natural stone or sand such as a chert, traprock, granite, quartz, limestone, basalt, silica sand, etc., or a manufactured or treated product such as burned clay, tabular alumina or blast furnace slag, used in conjunction with a cementing agent to form a solid body of concrete or a "concretion" of desired form. As employed in concrete mixtures the aggregates are customarily graded from any desired maximum size, usually not more than about 1½ inch sieve size or more than one-half the thickness of the concrete product being formed, downward continuously to the smallest size particle employed, in such manner as to result in a practical minimum of voids. The final voids of such mixture are filled with a cementing agent which, after curing, produces an essentially solid mass. The required gradation of aggregates is obtained by screening or crushing and screening of the original materials. The minimum size of concrete aggregates commercially available is usually that which is retained on a 100 mesh screen.

The term "concrete" is used herein to describe a mass composed of graded aggregates cemented together with a plastic resin.

Many concrete products made with conventional portland cement do not have sufficient strength or resistance to weathering and chemical attack to meet industrial needs. It has been proposed in the past to coat conventional portland cement concrete products, such as pipe, with polyester resins to make the product more durable and resistant to weathering and chemical attack. U.S. Patent 2,962,052 discloses such a use. However, it is difficult and expensive to apply polyester resins to portland cement concrete surfaces.

Our invention eliminates such disadvantages by providing a plastic concrete, say, a polyester resin concrete which can be cast to form the desired product, thereby avoiding the necessity of a subsequent coating step. At first throught it might appear that construction products cast with polyester resins are too expensive to replace conventional concrete products. However, we have discovered that by using an appropriate aggregate with a plastic resin as a binder, that cast products can be made which are lighter and stronger than conventional portland cement concrete products, and which have greater resistance to weathering and chemical attack.

The term "polyester resin" is used to mean a mixture of an ethylenically unsaturated alkyd resin and polymerizable vinyl monomer such as styrene. The resin chemist is familiar with polyester resins. The preferred resins of this class for employment in the concrete compositions of the invention are the polymeric ester reaction products of one or more dicarboxylic acids and one or more polyhydric alcohols. One or more of these reactants contains a reactive double bond or ethylenic linkage. Among the dicarboxylic acids which may be used are phthalic, malic, maleic, fumaric, adipic, pimelic, suberic, sebacic, itaconic, citraconic, and succinic acids and their anhydrides. It is preferred that some of the dicarboxylic acid components of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is a satisfactory polyhydric alcohol. An unsaturated monohydric alcohol may be used in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 40% and preferably 40% to 60% by weight of the resin and resin forming component, e.g., styrene, of the composition.

The resin should also contain a nonvolatile, monomeric, cross-linking solvent for the polyester. The function of this solvent is to make the polyester resin more fluid and also to cross-link the polyester at the time of curing to produce a cross-linked, or three dimensional resin with the polyester which is thermosetting in character. This monomeric solvent is an important member of the resin component, for it provides the necessary fluidity to the resin component, imparts thermosetting characteristics to the cured resin and is consumed during the curing of the resin without forming volatile materials. This freedom from volatility is important for otherwise the release of volatile matter would produce bubbles, voids, or pinholes on the surface and throughout the finished coating of the pipe. The lack of volatile matter permits curing when under pressure without requiring provision for vents, etc., in the molds.

Among the monomeric polymerizable solvents which may be used are styrene, vinyl toluene, e.g., o-vinyl toluene, p-vinyl toluene, and m-vinyl toluene; cyclo-pentadiene; vinyl acetate; diallyl esters, e.g., diallyl phthalate and triallyl cyanurate, as well as alphamethyl styrene. Styrene has produced the most satisfactory results thus far.

When produced commercially, these resin compositions contain a small amount of a polymerization inhibitor so as to prevent gelation during storage prior to usage. Such inhibitors include the well-known antioxidants: hydroquinone, t-butyl catechol, quinone, etc.

Some of the polyester resins of the character contemplated for use in the present invention are sold in the trade and identified as "Oronite," "Polylite," "Selectron," "Paraplex," or "Vibrin" resins. In general, these resins are unsaturated high molecular weight polymers made by reacting one or more acids or a blend of acids, such as maleic or fumaric acid, with a dihydroxy alcohol, such as ethylene glycol. The specific properties of these resins vary depending largely upon the type and amount of each constituent in the combination.

Examples of other high-polymer or copolymer plastics and resins or monomers used in our invention include both the thermosetting and thermoplastic materials.

Among the thermosetting resins are the epoxy, amino, alkyd, phenolic, polyester, urethane, allylic and silicone resins. Examples of the thermoplastics include nylon, polycarbonate, acrylic, acetal, vinyl, cellulosic, styrene, polystyrene, chlorinated polyether, fluorocarbon, polypropylene and polyethylene resins.

Numerous oxidizing catalysts, such as cumene hydroperoxide, dicumyl peroxide, benzolyl peroxide, and methyl-ethyl-ketone peroxide, can be used to speed the setting of the resin. The catalyst is usually employed in an amount of 0.5–4% of the polyester resin. Preferably, there is utilized with the catalyst a metallic drier such as manganese or cobalt naphthenate, for example. A typical example of a satisfactory catalyst-drier combination is 2% benzolyl peroxide, .75% manganese naphthenate and .75% cobalt naphthenate based on the polyester resin.

Briefly, the concrete product of our invention includes a mixture of polyester resin and aggregates. The aggregates are present in the amount of about 40% up to about 95% of the product by weight. The aggregate is preferably graded in particle size to range from less than 10 angstroms (.001 micron) up to the maximum size to leave a minimum of unfilled gaps or voids between adjacent particles of the aggregates. The maximum size or diameter of particles in any given usage would be generally limited to about one-half the thickness of the mass as finally employed by procedures of casting, forming, molding, screeding, spinning, or placing, and may be as much as several inches as determined by proper engineering procedures.

For the purposes of our invention, we supplement commercially available aggregates with materials passing the 100 mesh size and graded downward therefrom to produce a substantial percentage by weight of less than 20 microns size and extending preferably to less than 100 angstroms (.01 micron) in size. Hereinafter those particles of aggregate larger than about 20 microns are referred to as "aggregates" and those finer than about 20 microns size are referred to as "finely divided particles," "finely divided aggregate," or "fine particles." The finely divided particles are selected from materials of high strength (as distinguished from conventional, low-strength "fillers") and essentially inert chemically to the plastic materials with which they are employed. Examples are traprock dust, chert dust, silica flour ($SiO_2$), titanium flour ($TiO_2$), aluminum trioxide ($Al_2O_3$), tabular alumina, aluminum silicate, llanite (granite) dust, aluminum trifluoride, haydite, and porphyrite docite.

Ideally, the aggregates are graded so that spaces between the largest aggregate particles are progressively filled by smaller particles so as to leave virtually no voids between the particles. The polyester resin is present in sufficient amount to coat the entire surface of each aggregate particle and bond it to adjacent particles, and to fill those final voids in the mass which can be filled only by a liquid.

That part of the aggregate which is less than 300 mesh is preferably silica flour or titanium dioxide, or a mixture of both. We prefer 20 parts silica to one part titanium dioxide, by weight. Preferably, about 90% of the silica flour and the titanium dioxide passes through 400 mesh screen and the silica flour is virtually free of metallic content, say, less than .5% by weight, to avoid any acceleration of setting of the resin when the silica flour and resin are mixed. Other suitable, finely ground aggregates are given above.

The larger aggregate in the plastic concrete of this invention can be any suitable material such as natural stone, traprock (igneous rock), sand, or manufactured inorganic or organic particles.

An important advantage of the concrete of this invention is that it can be bonded to itself without special preparation of the surfaces, thereby permitting the bonding of one segment or layer of a product to another.

Preferably, the fine particles are of a particle size less than the average chain length of the plastic resin with which they are mixed. For example, in a typical polyester resin there are molecules from 20 to 1000 angstroms long, with more than one-half the molecules by weight being longer than 100 angstroms.

We have found that the use of finely divided particles, i.e., that aggregate which passes through 400 mesh screen (especially that in range of 0.005 to 1.0 micron), made of silica or titanium dioxide and used in conjunction with the larger graded aggregate as described above, greatly increases the strength of the final product so that it need not be as thick to provide much greater strength than is available with conventional portland cement concrete products. The finely divided aggregate also extends the shelf life of the polyester resin and apparently produces an additional bonding action between the resin and larger aggregate, which increases the final strength of the product. The presence of the finely divided aggregate also increases the tolerance of the polyester resin to traces of moisture which are nearly always present in the larger aggregate, and which otherwise would interfere with or prevent proper setting of the polyester resin. In general, any finely divided aggregate, which does not react detrimentally with the resin, can be used. The finely divided particles also permit the mixture to set in the presence of air without requiring the use of wax or other air excluding agents.

The panel of this invention is a slab of plastic concrete, preferably polyester resin concrete, having edges adapted to fit against edges of other slabs of polyester concrete, and means along the edges of the slab defining a channel to receive polyester resin to bind the edges of the slabs together.

Preferably, the edges of the panel are shaped to fit together and interlock with adjacent edges of another panel to provide automatic "keying" of joints to direct the proper assembly of the individual panels into the desired structure.

In one form, the edges of adjacent slabs form enclosed interconnecting channels which can be filled with polyester resin or cement after the slabs are assembled to form a desired structure. In another embodiment, the edges are shaped to form exposed channels which are filled with polyester cement after the structure is assembled. In another form, the panels are made wedge-shaped to fit together and form a circular roof to cover a circular container such as a silo. When additional strength is required, the panels are reinforced, preferably by a material which has the same thermal coefficient of expansion as the polyester concrete. Aluminum alloys such as Type 7075T6 are ideally suited for this use.

For maximum strength with minimum weight, the panel includes a first section of polyester concrete having projections extending transverse to a major plane of the first section. A second section of polyester concrete is disposed against the projections on the first section to form a double-walled panel with a space between the sections. A polyester resin cement bonds the two sections together. Preferably, the projections form a closed space within the panel to improve the thermal insulating qualities of the product.

In one form of the invention, the panels are assembled to form a silo with a circular wall, and reinforcing rods or bands are secured in tension around the circular wall. Preferably, the reinforcing rods are of a material such as aluminum alloy Type 7075T6 which has a thermal coefficient of expansion approximately the same as that of the polyester concrete.

Brief description of the drawings

These and other aspects of the invention will be more fully understood from the following detailed description and the accompanying drawings, in which:

FIG. 1 is a fragmentary elevation of a silo built with arcuate panels of this invention;

FIG. 2 is a view taken on line 2—2 of FIG. 1;

FIG. 3 is a view taken on line 3—3 of FIG. 1, showing the edges of the panels shaped to form an external channel;

FIG. 4 is a view taken on line 4—4 of FIG. 1;

FIG. 6 is a sectional view of a flat panel.

FIG. 9 is a view taken on line 9—9 of FIG. 8;

FIG. 10 is a sectional view of a hollow panel shaped at its edges to form internal cementing channels with other panels;

FIG. 11 is a view taken on line 11—11 of FIG. 10;

Description of the preferred embodiments

Figure 5:
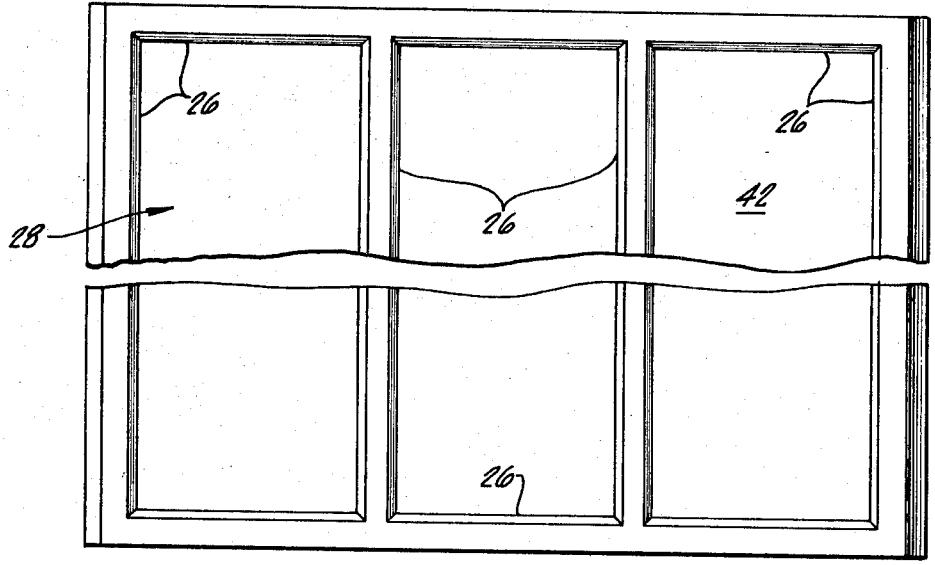
FIG. 5 is a view taken on line 5—5 of FIG. 4.

Referring to FIG. 1, a plurality of arcuate panels 20 are fitted together at their edges to form a circular wall 22 of a silo 23. As shown best in FIG. 4, each panel includes a first arcuate rectangular section 24 having a plurality of integrally formed projections or ribs 26 extending away from the convex side of a major plane of the section, and elongated in the direction of the major plane. A second arcuate rectangular section 28, coterminal with the first section, has projections or ribs 29 extending from its concave side. Ribs 29 are identical with and abut those of the first section. The two sections are each made by match mold casting of polyester resin concrete and are bonded together with polyester resin cement. Each of these two ingredients is described in detail below.

As shown best in FIG. 4, the left (as viewed in FIG. 4) edge of each panel includes an elongated longitudinally tapered tongue 30 which fits into a mating groove 31 formed along the right edge of each panel. As shown in FIGS. 2 and 3, the top and bottom edges of the panels are flat. However, the top and bottom edges of each panel can include tongue and groove construction identical with the side edges. The joint between the edges of adjacent panels can be plain, as at the left edge of the complete panel shown in FIG. 4, or the adjacent edges of each panel can have quarter-circle grooves 32 which fit together to make an elongated groove of semicircular cross section to receive polyester resin cement or mortar (i.e., polyester cement with graded sand added) to bond the panels together. In the full panel shown in elevation in FIG. 1, the right halves of the top and bottom edges have quarter-circle grooves, and the left halves are plain. In the latter case, a layer of polyester cement is applied to the plain edges before they are placed together.

As shown best in FIG. 5, the ribs 26 are formed around the edges of each section and include two centrally located ribs. Thus, when the ribs of the section fit together, they enclose air spaces 42 which improve the insulating property of the panel.

EXAMPLE 1

A polyester resin slurry was prepared by stirring in a mixing vessel a mixture having the following composition:

Percent by weight

About 60% by weight of Oronite CR 21728 polyester resin (made by reacting 3 mols of isophthalic anhydride with 6 mols of diethylene glycol and 1.5 mols of ethylene glycol until the acid number is less than 5. Four mols of maleic anhydride is then added with 150 p.p.m. hydroquinone and reacted until the acid number is below 20), and about 40% by weight of styrene monomer (the amount of styrene can be increased to about 60% by weight without adverse effect on the final product). (The Oronite CR 21728 is a so-called semi-flexible high impact resistance resin. Similar properties are obtained by blending an orthophthalic rigid resin with an orthophthalic flexible resin in a ratio of about 3.0 to 3.9 by weight provided "fine particles" less than about .5 micron are present in the amount of at least about 5% by weight of the resin, not including styrene.) _____ 70.85
Cobalt naphthenate _____ .38
Silica flour (the silica flour was ground and supplemented with colloidal silica to provide the chemical composition and screen analysis given in in Table I below) _____ 7.3
Titanium dioxide (all below 1.0 micron and some less than .001 micron) _____ 9.53
Styrene _____ 11.94

The above materials were thoroughly mixed with high speed, high shear equipment to provide thorough dispersion of the fine particles, and the mixture is referred to as polyester resin cement mix No. 1. It has a density of 10.5 pounds per gallon.

The above mixture has an almost indefinite shelf life because of the presence of the finely divided and pure silica flour. It can be used as a primer or seal coat in patching conventional portland cement structures, or it can be mixed with aggregate and cast as concrete as described below.

Polyester resin mix No. 1 is used as the cementing agent of a plastic concrete designed to cast the panels of this invention. For example, a polyester concrete is made by mixing the following ingredients.

EXAMPLE 2

| | Pounds |
|---|---|
| Polyester resin cement mix No. 1 | 9.10 |
| Methyl-ethyl-ketone peroxide (this is a catalyst and preferably is blended with the polyester resin Formula No. 1 prior to mixing with the larger aggregate) | 0.13 |
| Additional silica flour of the same character given in Example 1 | 15.17 |
| Fine (#4 to #100) silica aggregate [1] | 34.10 |
| Medium (1½″ to #4) silica aggregate [1] | 41.50 |

[1] Graded in accordance with New York Port Authority gradation of aggregate schedule, see Table VI below.

The aggregate and polyester resin cement mix No. 1 are mixed in a standard concrete mixer for two or three minutes to disperse the various particle sizes uniformly throughout the entire mixture and to insure uniform coating of all aggregate particles with polyester resin. The silica flour is blended in with high speed, high shear before the big aggregate.

The above concrete mixture was then cast and cured to make polyester concrete panels having a compressive strength of 10,000 p.s.i., and a tensile strength of 2,500 p.s.i. The above concrete cured at ambient temperature. If delay between mixing and placing polyester resin concrete is expected, the initial set is delayed from fifteen to thirty minutes to from six to eight hours by introducing a conventional retarder, such as hydroquinone, in the polyester resin formula No. 1 when the catalyst is added. The initial set is also controlled by adding the catalyst at varying rates.

Panels made with the following aggregates had the indicated corresponding compressive strength.

| Aggregate: | Compressive strength (p.s.i.) |
|---|---|
| Colorado River | 12,000 |
| Knippa rock | 15,000 |
| Quartzite | 17,000 |

The composition of the preferred silica flour is shown in Table I below:

TABLE I.—SILICA FLOUR

| Chemical composition | | Particle size | |
|---|---|---|---|
| Component | Percent by Wt. | Less than (micron)— | Percent by Wt. |
| SiO$_2$ | 99.600 | 100 | 100 |
| Al$_2$O$_3$ | 0.073 | 80 | 90 |
| Fe$_2$O$_3$ | 0.039 | 60 | 83 |
| TiO$_2$ | 0.28 | 40 | 72 |
| CaO$_2$ | 0.060 | 20 | 47 |
| MgO | 0.010 | 10 | 23 |
| Misc. | 0.050 | 5 | 5 |
| Moist. (105° C) [1] | 0.080 | 1 | 14 |

[1] Electron microscope showed major portion to be 10–80 angstroms (.001 to .008 micron).

NOTE.—The 53% of particles over 20 micron size is utilized as "aggregates." The 47% of particles under 20 micron size is used as "fine particles" which increases the strength of the final product.

Other examples of fine particle materials which have been used are:

TABLE II.—TITANIUM DIOXIDE FLOUR

| Chemical composition | | Particle size | |
|---|---|---|---|
| Component | Percent by Wt. | Less than (micron)— | Percent by Wt |
| TiO$_2$ | 99.20 | 1 | 100.0 |
| P$_2$O$_5$ | 0.30 | 0.75 | 97.0 |
| K$_2$O | 0.22 | 0.50 | 88.5 |
| SiO$_2$ | 0.08 | 0.40 | 78.5 |
| Al$_2$O$_3$ | 0.01 | 0.30 | 61.0 |
| Sb$_2$O$_3$ | 0.01 | 0.20 | 17.0 |
| Misc. | 0.18 | | |

TABLE III.—TRAPROCK DUST

| Chemical composition | | Particle size | |
|---|---|---|---|
| Component | Percent by Wt. | Less than (micron)— | Percent by Wt. |
| SiO$_2$ | 39.92–40.32 | 100 | 70.0 |
| MgO | 18.12–20.17 | 80 | 59.0 |
| CaO | 10.55–10.68 | 60 | 46.0 |
| Al$_2$O$_3$ | 8.60–9.46 | 40 | 31.0 |
| FeO | 7.48–8.00 | 20 | 15.5 |
| Fe$_2$O$_3$ | 4.40–4.75 | 10 | 12.6 |
| TiO$_2$ | 2.66–2.70 | 5 | 0.6 |
| Na$_2$O | 1.91–2.62 | 1 | 0.0 |
| K$_2$O | 1.03–1.10 | | |
| P$_2$O$_5$ | .51–.68 | | |
| MnO | .24–.25 | | |
| Misc. | .28–.41 | | |

NOTE.—The 84.5% of particles over 20 microns in size is employed as supplementary aggregates in concrete mixtures. The 15.5% of particles of under 20 micron size is employed as "fine particles," which increases the strength of the final product.

TABLE IV.—ALUMINUM SILICATE (ASP)

| Chemical composition | | Particle size | |
|---|---|---|---|
| Component | Percent by Wt. | Less than (micron)— | Percent by Wt. |
| SiO$_2$ | 45.4 | 20 | 98 |
| Al$_2$O$_3$ | 38.8 | 10 | 83 |
| TiO$_2$ | 1.5 | 1 | 10 |
| Fe$_2$O$_3$ | 0.3 | | |
| CaO | 0.1 | | |
| Na$_2$O | 0.1 | | |
| Ignition loss | 13.8 | | |

TABLE V.—TABULAR ALUMINA

| Chemical composition | | Particle size | |
|---|---|---|---|
| Component | Percent by Wt. | Less than (micron)— | Percent by Wt. |
| Al$_2$O$_3$ | 99.50 | 44 | 100 |
| SiO$_2$ | .06 | 20 | (¹) |
| Fe$_2$O$_3$ | .03 | | |
| Na$_2$O | .02 | | |
| Misc. | .39 | | |

[1] Inaccurately determined, estimated at 35%.

Other materials used as fine particle constituents include alumina (Al$_2$O$_3$), aluminum fluoride (AlF$_3$) and colloidal silica [consisting 100% of particle sizes under one micron (from about .001 to .008 micron)].

The use of aggregate materials and fine particles is not limited to the examples stated herein. The essential requirements in each case are that the constituent material possesses within itself definite structural characteristics compatible with the end product sought, and that it be free from any detrimental chemical reactivity with the plastic material with which it is employed.

The aggregate used in addition to the silica flour can be any material which does not adversely affect the curing of the polyester resin. Excellent results are obtained by using silica aggregate graded in accordance with the New York Port Authority Schedule shown in the following table:

TABLE VI

| Sieve size (square openings) | Percent passing by weight | | |
|---|---|---|---|
| | Fine aggregate | ¾" coarse aggregate | 1½" coarse aggregate |
| 2" | | | 100 |
| 1½" | | 100 | 95–100 |
| 1" | | 95–100 | 55–75 |
| ¾" | | 60–80 | 35–55 |
| ⅜" | | 15–40 | 5–20 |
| No. 4 | 90–100 | 0–5 | 0.5 |
| No. 8 | 80–95 | (¹) | (²) |
| No. 30 | 25–55 | | |
| No. 50 | 13–25 | | |
| No. 100 | 0–5 | | |

¹ Used for thin sections.
² Used for heavy sections.

The polyester resin concrete of Example 2 is satisfactory for use at temperatures up to about 80° C. (176° F.).

To make a polyester concrete for use at temperatures up to 130° C. (266° F.) Oronite CR 20114 polyester resin is substituted for Oronite CR 21728 in Examples 1 and 2. Other chemical and physical properties described above are not materially changed. Oronite CR 20114 is an isophthalic unsaturated polyester made by reacting one mol of isophthalic anhydride with 3.41 mols of propylene glycol at 400° F. until the acid number is below 5. Two mols of maleic anhydride are added to the mixture, which is then cooked at 390° F. until the acid number is below 25. The temperature is then raised to 415° F. until the acid number is below 15. 150 p.p.m. of hydroquinone is added with the maleic anhydride.

FIG. 3 shows a cylindrical tank 15, with a circular bottom 16, cast integrally out of poyester resin concrete in accordance with this invention.

The concrete pipe, the beam-slab, and the tank have all the physical and chemical properties inherent in products made with the polyester resin concrete of this invention. They are strong and lightweight, chemical and weather resistant, and flame resistant with self-extinguishing properties.

A shown in FIG. 4, a polyester resin concrete slab 18 is cast in a mold 19 under pressure exerted by a piston 20. The pressure exerted on the polyester resin concrete mixture in the mold is between about 200 and 2,000 p.s.i. The applied pressure causes polyester concrete mixture to compact and interlock the aggregate particles and squeeze out the air entrapped in voids between particles of the mixture. The concrete so formed is then allowed to set or cure. This results in a concrete product of high density and strength, and requires a minimum amount of polyester cement.

The typical product made of the polyester resin concrete of this invention has an exceptionally high compressive strength. The effect of the presence of the silica flour is demonstrated by the following table:

TABLE VII

| Percent aggregate | | | Silica flour | Polyester resin mix without silica flour | Compressive strength (p.s.i.) |
|---|---|---|---|---|---|
| Coarse | Medium | Fine | | | |
| 35.0 | 27.5 | 27.5 | 0.0 | 10.0 | 8,000 |
| 45.0 | 17.0 | 26.0 | 2.0 | 10.0 | 8,400 |
| 37.0 | 15.0 | 22.0 | 15.0 | 10.0 | 10,000 |
| 35.0 | 15.0 | 23.0 | 17.0 | 10.0 | 10,900 |

The above table shows that by increasing the silica flour from zero to 2%, the compressive strength was increased 400 pounds from 8,000 to 8,400 p.s.i. The presence of 17% silica flour increased the compressive strength to 10,900 p.s.i.

In the above table where silica flour is indicated to be present in the amount of 0.0%, the polyester resin concrete in Example 1 was modified to contain no silica flour or titanium dioxide. In each of the examples in Table VII, the silica flour content is reported as a percentage by weight of the total weight of the specimens tested.

Even greater strength is obtained by using more fine particles in the .001 to .010 micron (10 to 100 angstroms) range.

The aggregate reported in Table VII is graded as follows:

Coarse _____ ⅜" to 1".
Medium _____ No. 8 to ⅜".
Fine _____ No. 100 to No. 8.

The distribution of the aggregates in the above groups is in accordance with the New York Port Authority Schedule for grading concrete aggregate.

Another typical example of a polyester resin cement composition used in making concrete panels is given below:

EXAMPLE 3

A polyester resin slurry is prepared by mixing the following composition:

Percent by weight

Combine one mol of phthalic anhydride with 2 mols of maleic anhydride in the presence of an excess of ethylene or propylene glycol, and reduce the end result with styrene monomer in the amount of about 50% by weight in a one-step polymerization process. This resin has an impact strength of about 1.8 foot pounds per inch when the measurement is made on unnotched izod _____ 69.20
Tricresyl phosphate _____ .06
Wax (melting point 120–135° F.) _____ 1.89
Cobalt naphthenate _____ .38
Silica flour (preferably the silica flour has the chemical and screen analysis given in Table I above) __ 7.30
Titanium dioxide _____ 9.53
Styrene _____ 11.64

The above materials are thoroughly mixed, and the mixture is referred to as polyester resin cement mix No. 3. It has a density of about 10.5 pounds per gallon.

The above mixture has an almost indefinite shelf life because of the presence of the finely divided and pure silica flour. It can be used as a primer or cementing coat in bonding articles to conventional portland cement structures, or it can be mixed with aggregate and cast as polyester resin concrete.

Alternatively, 2 mols of phthalic anhydride combined with one mol of maleic anhydride in a two-step polymerization process and reacted in the presence of an excess of ethylene or propylene glycol, the resultant resin being reduced with styrene monomer in an amount of about 40% by weight, results in a resin having an impact strength of about 1.0 foot pound per inch. This resin can be substituted for the one just described to make polyester resin cement of lower impact strength. Calcium sulphate is substituted for the silica flour and titanium dioxide in the above formulation to reduce further the impact strength of the polyester cement.

EXAMPLE 4

A polyester concrete is made by mixing the following ingredients:

Pounds
Polyester resin cement mix No. 3 (Example 3) __ 9.10
Methyl-ethyl-ketone peroxide (this is preferably blended with the polyester resin cement mix No. 1 prior to mixing with the larger aggregate) ____ 0.13
Additional silica flour _____ 15.17
Fine (#4 to #100) silica aggregate [1] _____ 34.10
Medium (1½" to #4) silica aggregate [1] _____ 41.50

[1] Graded in accordance with New York Port Authority gradation of aggregate schedule, see Table VI above.

The aggregate and polyester resin cement mix No. 3 are mixed in a standard concrete mixer for two or three minutes to disperse the various particles sizes uniformly throughout the entire mixture and to insure uniform coating of all aggregate particles with polyester resin.

The above polyester resin concrete mixture is then cast and cured to make polyester concrete panels as described above. The concrete cures at ambient temperature. If delay between mixing and placing polyester resin concrete is expected, the initial set may be delayed from fifteen to thirty minutes to from six to eight hours by adding conventional retarder, such as hydroquinone, in the polyester resin cement mix No. 1 when the catalyst is added.

The composition of the preferred silica flour used in polyester resin mix No. 1 is shown in Table VIII below.

Table VIII

| Chemical analysis: | Percent |
|---|---|
| Moisture at 105° C. | 0.08 |
| Additional ignition loss | 0.06 |
| Silica ($SiO_2$) | 99.60 |
| Aluminum oxide ($Al_2O_3$) | 0.073 |
| Ferric oxide ($Fe_2O_3$) | 0.039 |
| Titanium oxide ($TiO_2$) | 0.028 |
| Calcium oxide (CaO) | 0.06 |
| Magnesium oxide (MgO) | 0.01 |
| Undetermined | 0.05 |

| Wet screen analysis: | Percent by weight |
|---|---|
| +100 mesh | None |
| −100 mesh +140 mesh | 0.03 |
| −140 mesh +200 mesh | 0.54 |
| −200 mesh +325 mesh | 8.13 |
| −325 mesh +400 mesh | 1.43 |
| −400 mesh | 89.87 |

The bulk of the silica flour is between 10 and 80 angstroms.

In assembling a silo, separate panels, made with any of the above-described polyester resin concretes, are assembled on a base 48 and built up to the desired height. The panels are held in place by elongated metal reinforcing rods 50 which are threaded at their ends and secured in a clamp 52 by nuts 54 which permit the rods to be placed under any desired tension. The reinforcing rods may be of any suitable material, but preferably are of a metal which has a thermal coefficient of expansion similar to that of polyester concrete. For example, aluminum alloy 7075T6 is well suited for this purpose. The polyester panels are bonded together without loss of shear strength at the joints by using polyester resin cement as the bonding agent.

In the case of silos and tanks, the panels are set in the assembled position, drawn up snugly together with the reinforcing rods or bands, and cemented at the joints. The keying tongue and grooves at the edges of the panels ordinarily direct the proper assembly of the panels so that they form the wall in the desired shape. The bands are applied and tightened as the structure is erected to tighten the joints and eventually contain the horizontal thrust due to internal loading. After the final tightening of the bands, the cement is applied to weld the joints in final position, thus unifying the panels into a monolithic structure and providing a liquid- and air-tight seal.

Since polyester concrete has a coefficient of expansion approaching twice that of steel, it is desirable to use reinforcing bands or rods of a compatible material. Rods of commercial aluminum alloys having a coefficient of expansion closely approximating that of polyester concrete are ideally suited for banding. These rods ordinarily are used to post-tension the tank and accept the internal thrust just ahead of final joint sealing. However, since the polyester concrete and cement possess high tensile strength (compared to conventional portland cement concrete), considerable reliance may be placed on the polyester concrete and cement to carry a substantial part of the horizontal thrust in cases where the coefficient of expansion of the rods and concrete are fully compatible. In this case, the rods serve the dual purpose of adding to thrust resistance and securing the panels in position during erection and cementing of joints.

The high tensile strength of the polyester resin concrete and cement permits the walls of the panels to be considerably thinner than in those structures using conventional portland cement concrete. Since the polyester resin concrete and cement have a relatively high tensile strength, the strength required of the reinforcing rods is correspondingly less so that they can be of smaller dimension. Of course, other materials such as steel cable, iron or steel rods, etc., may be used in those cases where the additional stress due to difference in coefficient of expansion between the polyester resin concrete and the reinforcing bands is within the tolerance limits of the structure.

Commonly, tanks and silos are erected using staggered horizontal joints (see FIG. 1), and buildings are erected using full height uniform length panels. In each case, this arrangement may be reversed as convenience dictates.

FIG. 6 shows a panel 56 similar to that described with respect to FIGS. 1 through 5, except that the sections 57 are flat, and when fitted together, form flat panels. When the panels are assembled as shown in FIG. 6, they form a straight wall. To form a corner with the straight panels, an upright corner post 58 is provided with a tapered tongue 59 on one face 60 and a mating groove 61 on another face 62 at an angle of 90° to the first face to mate with the tongue and groove formed in the edges of the panels. If desired, the corner post is reinforced with aluminum rods 63. The polyester concrete has a thermal coefficient expansion of about 0.000012 per degree F., so preferably the reinforcing rods have a similar coefficient of expansion. We have found that aluminum alloy 7075T6, which has a thermal coefficient of expansion of about 0.000012 per degree F., is ideally suited for use with polyester concrete.

Figure 7:
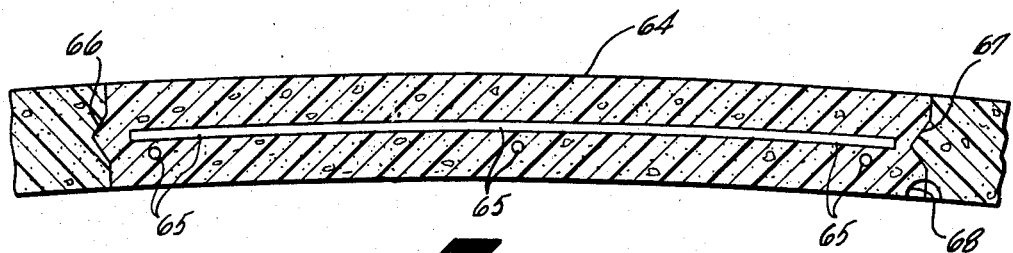
FIG. 7 is a sectional view of a solid form of the panel reinforced with aluminum rods.

FIG. 7 shows a cross section of an alternate arcuate panel 64 which is solid and reinforced with aluminum rods 65. The opposite edges of the panel include a tongue 66 and groove 67 to fit in matching grooves and tongues of adjacent panels. Elongated joint grooves 68, which are semicircular in cross section, are formed between adjacent edges of the panels to receive polyester resin cement for sealing panels together.

Figure 8:
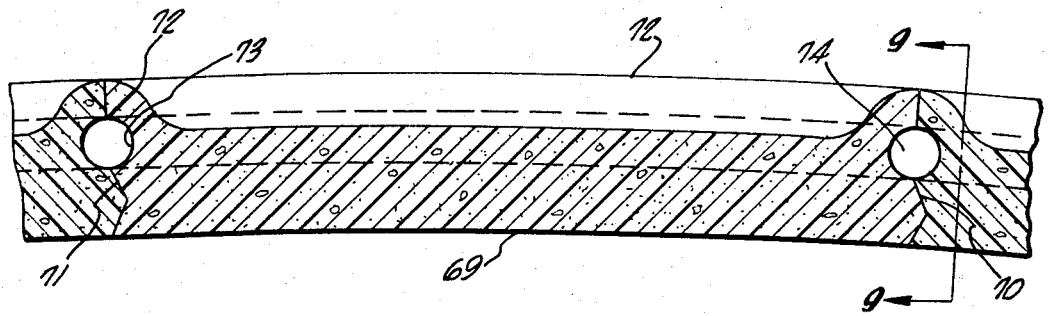
FIG. 8 is a sectional view of a solid arcuate panel having its edges shaped to form internal channels to receive polyester resin cement.

Referring to FIGS. 8 and 9, an arcuate polyester concrete solid panel 69 has a tongue 70 formed along one edge and a groove 71 along the opposite edge to mate with the tongue and groove of adjacent panels. A raised bead 72 is formed around the periphery of the panel, and includes an elongated outwardly facing groove 73 which is semicircular in cross section. Thus, when the edges of the panel shown in FIGS. 8 and 9 are fitted against edges of similar panels, closed channels 74, which are circular in cross section, are formed around the joints of adjacent panels.

After the panels shown in FIG. 8 are assembled to form a structure, say, a silo such as that shown in FIG. 1, the closed channels are filled by pouring polyester resin cement down into them, or pumping the cement up them until all channels are filled to the top of the structure. After the polyester resin cement sets, the panels are then bonded into a monolithic structure of high tensile strength.

In the panels shown in FIGS. 10 and 11, first and second rectangular sections 75, 76 respectively, include inwardly facing projections or ribs 77 which abut each other and are sealed together by polyester resin cement. Reinforcing rods 78, say, of aluminum alloy, are imbedded in each of the sections to give additional strength. One edge of the panel includes a tongue 79 and the opposite edge of the panel includes a groove 80, so that a number of the panels can be fitted together at their edges. The adjacent edges of the panels each include quarter-circular elongated recesses 81, so that an internal panel-cementing channel 82 is formed when two panels are fitted together at their edges.

Figure 12:
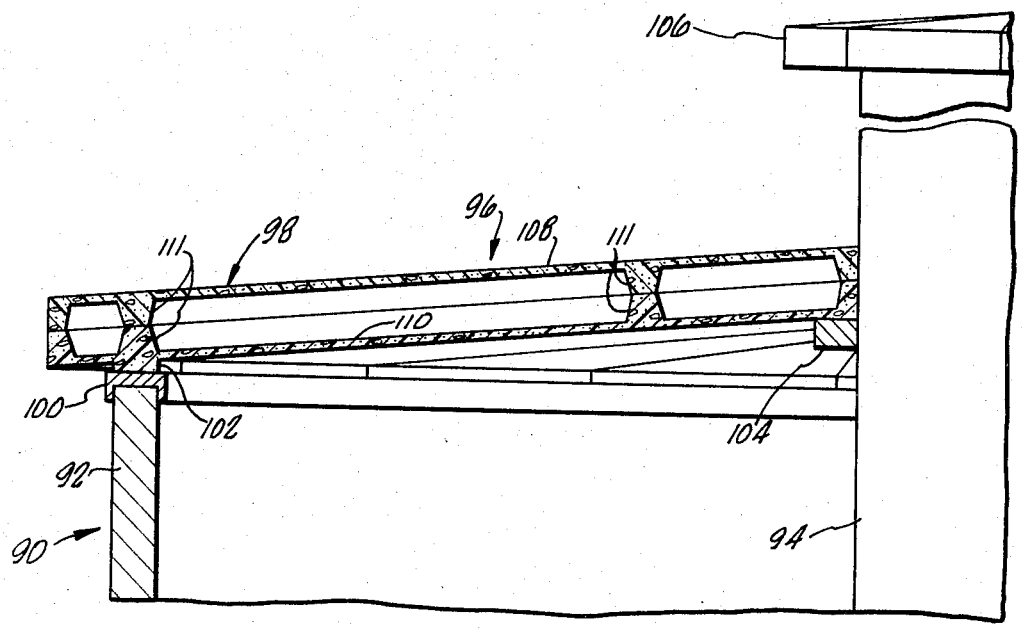
FIG. 12 is a schematic fragmentary elevation of a building made with arcuate panels of the type shown in FIGS. 4 and 10.

Arcuate panels (such as those shown in FIGS. 4, 8 and 10) can be used to build a circular building 90, such as that shown in FIG. 12. A circular exterior wall 92 is formed around a circular core wall 94, which is made of arcuate panels having a radius of curvature less than that of the panels forming the exterior walls. A roof 96 of the building is formed from a plurality of wedge-shaped panels 98 which rest on a wall cap 100 on the upper edge of outer wall 92. Preferably, an arcuate downwardly extending foot 102 formed integrally on the lower face of each wedge-shaped panel rests on the wall cap and makes a sliding bearing on it to compensate for temperature variation. The inner end of each panel rests on an annular roof support bracket and wall tie 104 secured to the exterior of the core wall 94. The core wall is covered by a circular roof 106 formed integrally of polyester concrete.

Figure 13:
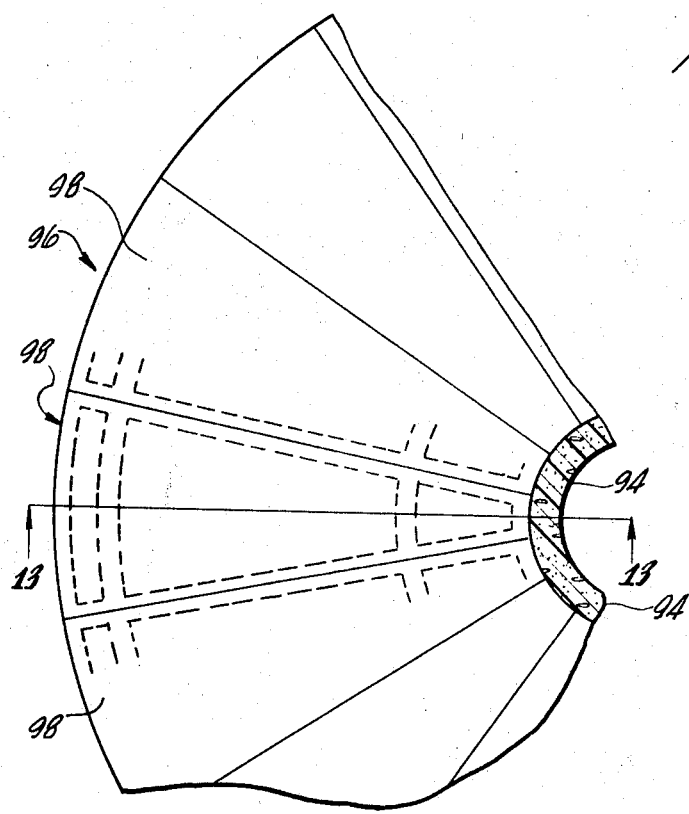
FIG. 13 is a fragmentary plan view of the building shown in FIG. 12.

The roof of a polyester concrete structure can be either solid or hollow. For tanks and silos, a thin shell polyester concrete dome is desirable. For housing, a hollow slab is preferred because of its better thermal insulation. The panels in the roof shown in FIGS. 12 and 13 are hollow. Each panel includes an upper section 108 and a lower section 110 with inwardly extending ribs 111 which abut and are bonded together by polyester resin cement. If desired, straight panels can be used for interior walls (not shown) in the buildings shown in FIGS. 12 and 13.

The family of aluminum alloys with the thermal coefficient of expansion matching that of polyester resin concrete commonly includes zinc, magnesium, and copper. These aluminum alloys will react with the polyester during prolonged polymerization periods. Partial protection is afforded by the aluminum oxide coating on the reinforcing bars. Complete protection is provided by heating the bars. Immediately following the heat treatment, and while the bars are still hot, the polyester resin concrete is placed around them so that the resin sets immediately on contacting the hot bars and protects them from further reaction.

Alternatively, the aluminum bars are heated and, while hot, a one to three mils coat of polyester resin or polyester resin cement is sprayed on them. The polyester resin sets almost instantly and without appreciable reaction with the aluminum rods. Preferably, the polyester resin cement includes 50% to 75% flexible polyester resin by weight to permit handling. The polyester resin coating on the aluminum not only provides protection from reaction with the polyester resin, but at the same time provides electrical insulation (500 volts per mil) against a subsequent electrolytic action.

We claim:

1. A precast panel for use in assembling structures such as tanks, silos, buildings, and the like, the panel comprising a slab of polyester concrete having a thermal coefficient of expansion of about $1.2 \times 10^{-5}$ per degree F., the polyester concrete comprising a mixture of polyester resin and graded aggregate ranging in particle size from less than 400 mesh up to about one-half the thickness of the panel, the polyester resin being present in the concrete in an amount less than about 25% by volume and sufficient to coat the aggregate with resin, the slab having edges adapted to fit against edges of other slabs of polyester concrete, means along the edges of the slab defining a channel, polyester cement in the channel to bond the edges of the slab to edges of other slabs, the polyester cement comprising a mixture of polyester resin and an inorganic filler ground to pass through 400 mesh, and an aluminum reinforcing rod secured to the slab, the rod having substantially the same thermal coefficient of expansion as the polyester concrete.

2. A precast panel for use in assembling structures such as tanks, silos, buildings, and the like, the panel comprising a slab of polyester concrete, the polyester concrete comprising a mixture of polyester resin and graded aggregate ranging in particle size from less than 400 mesh up to about one-half the thickness of the panel, the polyester resin being present in the concrete in an amount less than about 25% by volume and sufficient to coat the aggregate with resin, the slab having edges adapted to fit against edges of other slabs of polyester concrete, means along the edges of the slab defining a channel, polyester cement in the channel to bond the edges of the slab to edges of other slabs, the polyester cement comprising a mixture of polyester resin and an inorganic filler ground to pass through 400 mesh, and aluminum reinforcing rods embedded in the panel, the rods having substantially the same thermal coefficient of expansion as the polyester concrete.

3. A structure including a circular wall of precast polyester concrete panels disposed with their edges abutting, the polyester concrete comprising a mixture of polyester resin and graded aggregate ranging in particle size from less than 400 mesh up to about one-half the thickness of the panel, the polyester resin being present in the concrete in an amount less than about 25% by volume and sufficient to coat the aggregate with resin, polyester cement bonding the panels together at their edges, each panel, comprising a first arcuate section of polyester concrete having a major plane and projections extending transverse to the major plane, a second arcuate section of polyester concrete disposed against the projections on the first section to form a double-walled panel with a space between the sections, polyester cement bonding the two sections together, the polyester cement comprising a mixture of polyester resin and an inorganic filler ground to pass through 400 mesh, and aluminum rods secured in tension around the wall, the rods having substantially the same thermal coefficient of expansion as the polyester concrete.

4. A precast panel for use in assembling structures such as tanks, silos, buildings, and the like, the panel comprising a first section of polyester concrete having a major plane and projections extending transverse to the major plane, a second section of polyester concrete disposed against the projections on the first section to form a double-walled panel with a space between the sections, the polyester concrete comprising a mixture of polyester resin and graded aggregate ranging in particle size from less than 400 mesh up to about one-half the thickness of the panel, the polyester resin being present in the concrete in an amount less than about 25% by volume and sufficient to coat the aggregate with resin, polyester cement bonding the two sections together, the polyester cement comprising a mixture of polyester resin and an inorganic filler ground to pass through 400 mesh, and aluminum reinforcing bars embedded in at least one of the sections, the bars having substantially the same thermal coefficient of expansion as the polyester concrete.

5. A precast panel for use in assembling structures such as tanks, silos, buildings, and the like, the panel comprising a slab of plastic resin concrete, the plastic concrete comprising a mixture of plastic resin and graded aggregate ranging in particle size from less than the average length of the molecules of the plastic resin up to about one-half the thickness of the panel, the plastic resin being present in the concrete in an amount less than about 25% by volume and sufficient to coat the aggregate with resin, the slab having edges adapted to fit against edges of other slabs of plastic concrete, means along the edges of the slab defining a channel, plastic resin cement in the channel to bond the edges of the slab to edges of other slabs, the cement comprising a mixture of plastic resin and inorganic fine particles which pass through 400 mesh, a substantial portion of the fine particles being of a size less than the average length of the molecules of the plastic resin.

References Cited

UNITED STATES PATENTS 1,360,408  11/1920  Johnson _____ 52—248
1,378,735  5/1921   Talbot _____ 52—595

(Other references on following page)

| | | UNITED STATES PATENTS | |
|---|---|---|---|
| 1,844,497 | 2/1932 | Brassert et al. | 52—248 |
| 1,889,699 | 11/1932 | Ranck | 52—429 |
| 2,075,872 | 4/1937 | Smith | 52—224 X |
| 2,281,967 | 5/1942 | Zazvka | 52—293 |
| 2,836,529 | 5/1958 | Morris | 52—309 X |
| 3,025,992 | 3/1962 | Humphrey | 220—5 |
| 3,078,249 | 2/1963 | Russell | 260—40 |
| 3,171,772 | 3/1965 | Lomar | 52—309 X |
| 3,189,568 | 6/1965 | Sparks et al. | 260—22 |
| 3,326,845 | 6/1967 | Arens | 260—40 |

| | | FOREIGN PATENTS |
|---|---|---|
| 162,742 | 3/1955 | Australia. |
| 434,715 | 2/1912 | France. |
| 680,886 | 1/1930 | France. |
| 872,855 | 4/1953 | Germany. |
| 271,442 | 2/1930 | Italy. |
| 503,523 | 1954 | Italy. |

ALFRED C. PERHAM, *Primary Examiner.*

U.S. Cl. X.R.

52—82, 249, 309, 429, 572, 602

FO-1050
(5/69)

UNITED STATES PATENT OFFICE
CERTIFICATE OF CORRECTION

Patent No. 3,443,347              Dated  May 13, 1969

Inventor(s)  William R. Varnell and Mance R. Mitchell

It is certified that error appears in the above-identified patent and that said Letters Patent are hereby corrected as shown below:

Column 1, line 23, change "366,322" to --366,332--.

Column 1, line 51, change "as" to --by--.

Column 7, line 35, after "shear" insert --equipment--.

Column 9, line 42, change "A" to --As--.

SIGNED AND
SEALED

SEP 9 - 1969

(SEAL)
Attest:

Edward M. Fletcher, Jr.
Attesting Officer

WILLIAM E. SCHUYLER, JR.
Commissioner of Patents